(12) United States Patent
Nagasawa

(10) Patent No.: US 11,358,563 B2
(45) Date of Patent: Jun. 14, 2022

(54) OUTSIDE PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/119,169

(22) Filed: Dec. 11, 2020

(65) Prior Publication Data

US 2021/0197757 A1   Jul. 1, 2021

(30) Foreign Application Priority Data

Dec. 27, 2019 (JP) .............................. JP2019-239818
Oct. 6, 2020 (JP) .............................. JP2020-168801

(51) Int. Cl.
*B60R 19/20* (2006.01)
*B60R 21/34* (2011.01)
*B60R 21/36* (2011.01)

(52) U.S. Cl.
CPC ............ *B60R 21/36* (2013.01); *B60R 19/205* (2013.01); *B60R 2021/346* (2013.01)

(58) Field of Classification Search
CPC ........ B60R 21/233; B60R 2021/23308; B60R 2021/23316; B60R 21/2338; B60R 2021/0004; B60R 2021/346; B60R 19/205; B60R 21/36
See application file for complete search history.

(56) References Cited

U.S. PATENT DOCUMENTS

| 2004/0074690 | A1* | 4/2004 | Sato | B60R 21/36 180/274 |
|---|---|---|---|---|
| 2017/0072897 | A1* | 3/2017 | Kruse | B60R 21/203 |
| 2019/0071050 | A1* | 3/2019 | Farooq | B60R 21/233 |
| 2019/0375366 | A1* | 12/2019 | Kanno | B60R 21/0134 |
| 2019/0375368 | A1* | 12/2019 | Kanno | B60R 21/36 |

FOREIGN PATENT DOCUMENTS

| EP | 3321139 A1 * | 5/2018 | ............ B60R 21/36 |
|---|---|---|---|
| EP | 3590774 A1 * | 1/2020 | ............ B60R 21/36 |
| JP | 2017-178205 A | 10/2017 | |

* cited by examiner

*Primary Examiner* — Paul N Dickson
*Assistant Examiner* — Maxwell L Meshaka
(74) *Attorney, Agent, or Firm* — Smith, Gambrell & Russell, LLP

(57) ABSTRACT

An outside protection apparatus for a vehicle includes an outside airbag device. The outside air bag device includes a first bag body, an inflator, and a second bag body. The first bag body is expandable to be overlaid on a hood of a body of the vehicle rearwardly from a front portion of the body. The inflator is configured to expand the first bag body. The second bag body is expandable from a side portion of the first bag body in a width direction of the vehicle later than the first bag body.

20 Claims, 9 Drawing Sheets

OUTSIDE PROTECTION APPARATUS FOR VEHICLE

CROSS-REFERENCE TO RELATED APPLICATIONS

The present application claims priority from Japanese Patent Application No. 2019-239818 filed on Dec. 27, 2019 and Japanese Patent Application No. 2020-168801 filed on Oct. 6, 2020, the entire contents of which are hereby incorporated by reference.

BACKGROUND

The disclosure relates to an outside protection apparatus for a vehicle.

On a road and the like outside a vehicle, there are present other moving objects, pedestrians, cyclists, riders, and the like. The vehicle has a possibility of colliding with such an outside person and the like during traveling or during parking or stopping. Therefore, it has been considered to provide vehicles with an outside protection apparatus (Japanese Unexamined Patent Application Publication (JP-A) No. 2017-178205).

SUMMARY

An aspect of the disclosure provides an outside protection apparatus for a vehicle. The apparatus includes an outside airbag device. The outside air bag device includes a first bag body, an inflator, and a second bag body. The first bag body is expandable to be overlaid on a hood of a body of the vehicle rearwardly from a front portion of the body. The inflator is configured to expand the first bag body. The second bag body is expandable from a side portion of the first bag body in a width direction of the vehicle later than the first bag body.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 1 is an illustration of a secondary collision assumable for an outside pedestrian, an outside cyclist, and the like that has collided with a first automobile;

DETAILED DESCRIPTION

It is conceivable for a vehicle to expand, instead of moving a bonnet hood as in JP-A No. 2017-178205, an airbag for an outside person, for example, on a bonnet hood or in front of a windshield and pillars at left and right two side portions of the windshield. Using such an outside airbag device may avoid a direct collision of an outside person with a vehicle body.

There is however a possibility that this is not necessarily sufficient as protection of an outside person.

For an outside protection apparatus for a vehicle, a further improvement in protection of an outside person is addressed.

Hereinafter, an embodiment of the disclosure will be described on the basis of the drawings.

Figure 1A:
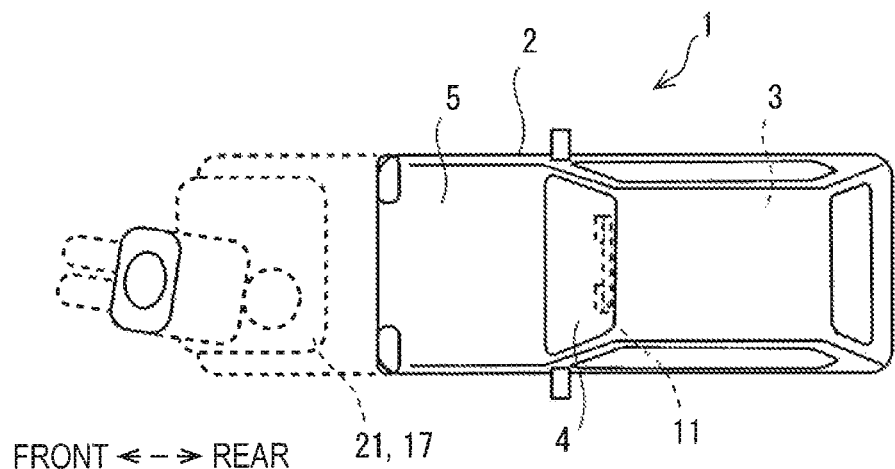
FIG. 1A and FIG. 1B are illustrations of an automobile according to an embodiment of the disclosure.
Figure 1B:
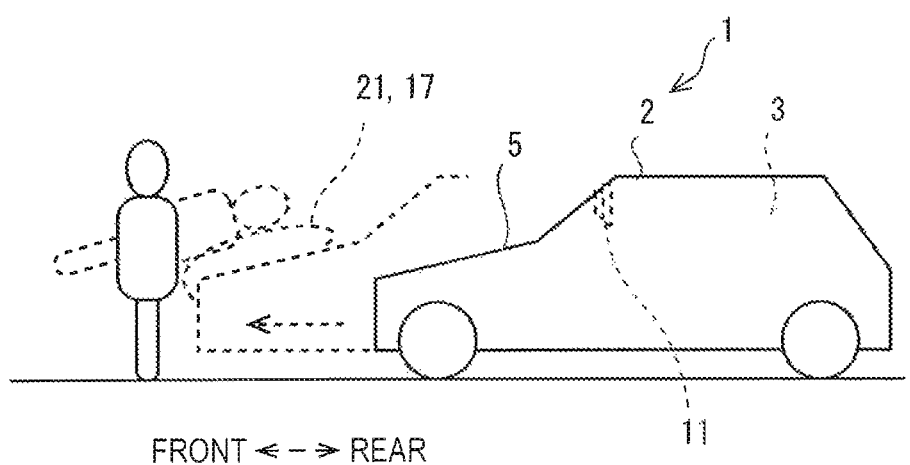

FIG. 1A and FIG. 1B are illustrations of an automobile 1 according to an embodiment of the disclosure.

FIG. 1A is a top view of the automobile 1, FIG. 1B is a left side view of the automobile 1. FIG. 1A and FIG. 1B illustrate, together with the automobile 1, a pedestrian as an outside person outside the automobile 1. In addition, for example, a cyclist, a rider, and the like may be present outside the automobile 1. These outside persons may traverse by crossing in front of the automobile 1 that travels. Then, the automobile 1 has a possibility of colliding with the person that intends to cross in front of the automobile 1.

The automobile 1 in FIG. 1A and FIG. 1B is an example of a vehicle. The automobile 1 includes a body 2. In front of a cabin 3 of the body 2, a windshield 4 is provided. At the front portion of the body 2 on the front side from the windshield 4, a bonnet hood 5 is provided to be openable and closable.

Figure 2:
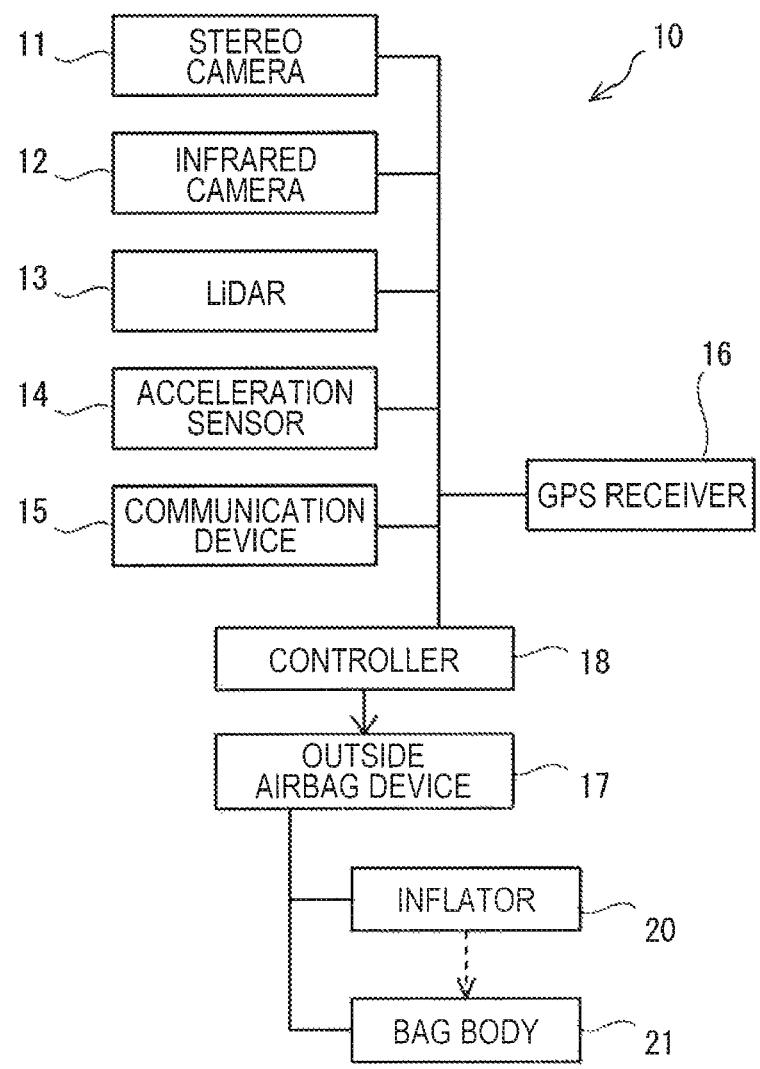
FIG. 2 is a block diagram of an outside protection apparatus of the automobile in FIG. 1A and FIG. 1B.

FIG. 2 is a block diagram of an outside protection apparatus 10 of the automobile 1 in FIG. 1A and FIG. 1B.

The outside protection apparatus 10 in FIG. 2 includes a stereo camera 11, an infrared camera 12, a LiDAR 13, an acceleration sensor 14, a communication device 15, a GPS receiver 16, an outside airbag device 17, and a controller 18 to which these are coupled. Each of these sensors and devices of the outside protection apparatus 10 may be coupled to a CPU as the controller 18 by a vehicle network (not illustrated).

The stereo camera 11 is disposed at, for example, a front portion of a cabin, as illustrated in FIG. 1A and FIG. 1B, to be directed to the front. The stereo camera 11 includes a plurality of imaging devices disposed side by side in a vehicle width direction. The stereo camera 11 images an outside person and the like to be imaged by the plurality of imaging devices. The stereo camera 11 may calculate a direction and a distance regarding an imaged outside person based on the body 2. The stereo camera 11 may calculate, on the basis of the position of an outside person that is a subject in images imaged by the plurality of imaging devices, the direction and the distance of the subject by, for example, triangulation or the like. In addition, the stereo camera 11 may calculate presence/absence of the movement, the movement direction, the movement velocity, and the like of a subject from a change in the position of the subject in images imaged by shifting time.

The infrared camera 12 is disposed at, for example, a front portion of the cabin, as with the stereo camera 11, to be directed to the front. The infrared camera 12 images an infrared image in which an outside person and the like are imaged.

The LiDAR 13 is disposed at, for example, a front portion of the body 2 to be directed to the front. The LiDAR 13 emits light toward the front and obtains the direction, the distance, the velocity, and the like of a subject on the basis of reflection light reflected by an outside person in front of the body 2.

The body 2 is provided with the acceleration sensor 14. Acceleration that acts on the acceleration sensor 14 is detected. When the body 2 comes into contact with a moving object, such as a person, the acceleration sensor 14 detects large acceleration such as that not generated during normal traveling. In this case, the acceleration sensor 14 may output detection of a collision. In this case, the acceleration sensor 14 serves as a collision detector that predicts or detects a collision between the body 2 and the other moving object.

The communication device 15 communicates through wireless communication with the other moving objects, for example, the other communication devices 15 of the other automobile 1 and pedestrians, base stations disposed along roads, and the like. The communication device 15 may obtain the current position, the movement direction, the movement velocity, and the like of the other moving objects from the other communication devices 15.

The GPS receiver 16 receives radio waves from GPS satellites and the like and obtains the current position, the movement velocity, and the like of the automobile 1.

Information on, for example, the current position of the automobile 1 may be based on information according to a GNSS receiver other than GPS or information provided by a mobile telephone.

The outside airbag device 17 includes, for example, a main bag body 21 expandable to be overlaid on the outer surface of the body 2 of the automobile 1, and an inflator 20 that expands the main bag body 21. The main bag body 21 may include, for example, nylon or the other resin fiber to have smooth surfaces. For example, as illustrated in FIG. 1A and FIG. 1B, the main bag body 21 may be expanded rearward from the front portion of the body 2 on the bonnet hood 5 at the front portion of the body 2. In this case, when the upper body of an outside person that comes into contact with the front of the body 2 falls down toward the front portion of the body 2, the main bag body 21 that is to be expanded on the bonnet hood 5 is expanded between the upper body and the bonnet hood 5. The body of the outside person that comes into contact with the body 2 is suppressed from easily coming into direct contact with the bonnet hood 5. As a result of the expanded main bag body 21 being flexed or contracted by the load of the body of the outside person, strong impact is suppressed from easily acting on the body of the outside person. The expanded main bag body 21 can absorb the impact that acts on the outside person.

The controller 18 is, for example, a CPU. The controller 18 may be provided as, for example, a CPU dedicated to the outside airbag device 17 in the automobile 1 or may be provided as a CPU of inside and outside protection devices of the automobile 1 in the automobile 1. The CPU reads a program from a storage, such as a ROM, and executes the program. Thus, the CPU serves as the controller 18 of the outside airbag device 17 for protecting at least an outside person. The controller 18 of the outside airbag device 17 obtains, from collision detectors, such as the stereo camera 11, the infrared camera 12, the LiDAR 13, the acceleration sensor 14, and the communication device 15, information on a pedestrian, a cyclist, a rider, or the like that moves on a route of the automobile 1 or that intends to move toward the route. When a collision with an outside person is predicted or detected on the basis of the obtained information, the CPU controls expansion of the main bag body 21 of the outside airbag device 17.

Figure 3:
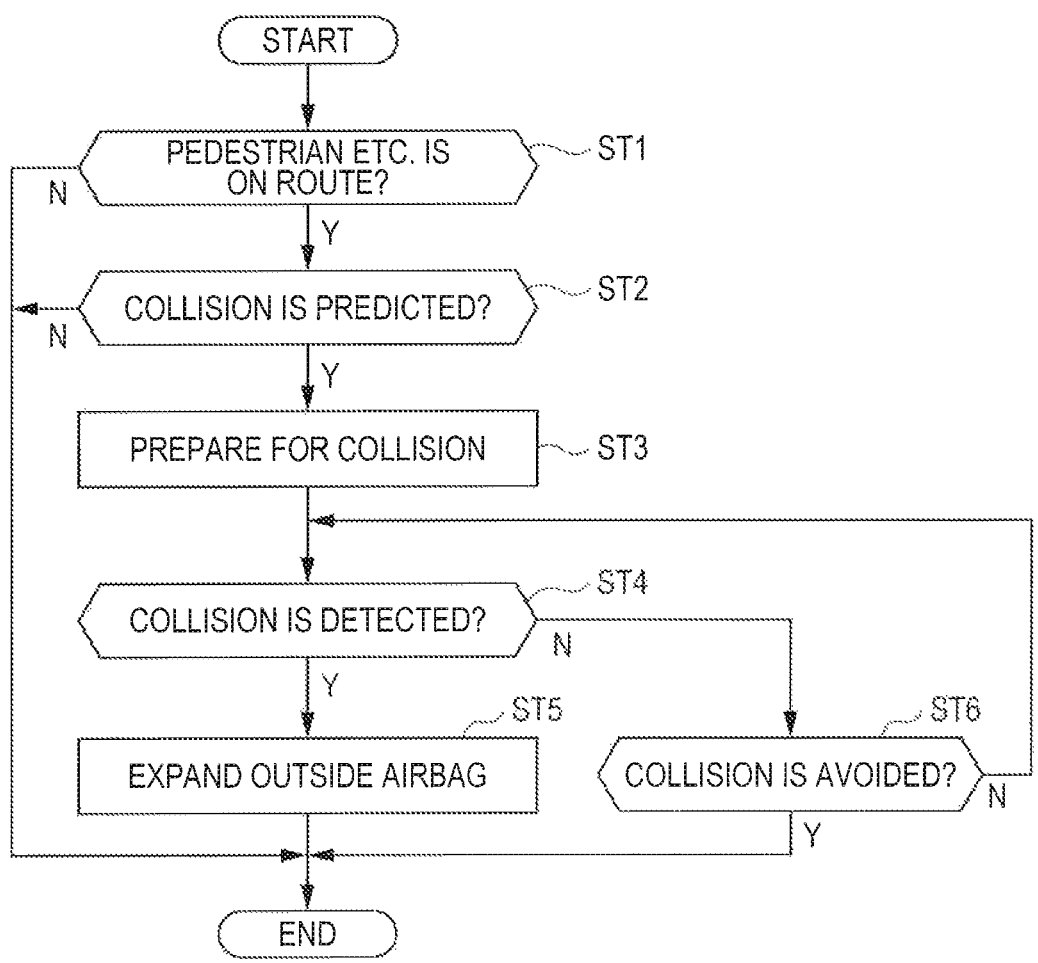
FIG. 3 is a flowchart of outside protection control by a controller in FIG. 2.

FIG. 3 is a flowchart of outside protection control by the controller 18 in FIG. 2.

The controller 18 executes the outside protection control in FIG. 3 repeatedly when, for example, the automobile 1 travels. The controller 18 may execute the outside protection control in FIG. 3, for example, periodically or at every time when the automobile 1 obtains new information. The new information that the automobile 1 obtains may be the above-described information on a pedestrian, a cyclist, a rider, or the like that moves on the route of the automobile 1 or that intends to move toward the route but is not limited thereto. The controller 18 may start the processing in FIG. 3 on the basis of obtaining new information.

In a step ST1, the controller 18 determines whether a pedestrian and the like are present on a route of the automobile 1 on the basis of newly obtained information on outside persons. The controller 18 may determine whether a pedestrian and the like are present on a route of the automobile 1 on the basis of, for example, whether the position of a detected outside person is on the route, whether the movement direction of the detected outside person intersects the route, and the like. When a pedestrian and the like are not present on the route of the automobile 1, the controller 18 ends the processing in FIG. 3. When a pedestrian and the like are present on the route of the automobile 1, the controller 18 causes the processing to proceed to a step ST2.

In the step ST2, the controller 18 predicts a collision with a pedestrian and the like present on the route of the automobile 1. The controller 18 may predict a collision with a pedestrian and the like on the route of the automobile 1 on the basis of, for example, whether a time difference between a timing when the automobile 1 reaches the position of the pedestrian or the position of intersection and a timing when the pedestrian reaches the position of intersection is a predetermined value or less. When a collision with a pedestrian and the like on the route of the automobile 1 is not predicted, the controller 18 ends the processing in FIG. 3. When a collision with a pedestrian and the like on the route of the automobile 1 is predicted, the controller 18 causes the processing to proceed to a step ST3.

In the step ST3, the controller 18 starts preparation for a collision with a pedestrian and the like on the route of the automobile 1. For example, the controller 18 causes the outside airbag device 17 to start. For example, the outside airbag device 17 is caused to enter a state in which the inflator 20 is able to jet a gas having a high temperature and a high pressure in response to an input of an ignition signal. For example, when the expansion start location and the expansion start direction of the main bag body 21 are adjustable, the outside airbag device 17 adjusts the expansion start location and the expansion start direction of the main bag body 21 so that the main bag body 21 is expanded from a portion that is predicted to collide with a pedestrian.

In step ST4, the controller 18 detects a predicted collision with a pedestrian and the like on the basis of presence/absence of collision detection by the acceleration sensor 14. When a collision is detected by the acceleration sensor 14, the controller 18 causes the processing to proceed to a step ST5. When no collision is detected by the acceleration sensor 14, the controller 18 causes the processing to proceed to a step ST6.

In the step ST5, the controller 18 expands the outside airbag. The controller 18 outputs an ignition signal to the outside airbag device 17. The inflator 20 of the outside airbag device 17 jets a high-pressure gas into the main bag body 21. The main bag body 21 is expanded on the bonnet hood 5. Thus, the controller 18 expands the main bag body 21 of the outside airbag device 17 on the basis of predicting or detecting a collision between the body 2 and the other moving object.

In a step ST6, the controller 18 determines whether a collision is avoided on the basis of information that is newly obtained after the determination in the step ST1. The controller 18 may determine whether a collision with a pedestrian and the like for which a collision is predicted is avoided, on the basis of, for example, whether the position of an outside person for which a collision is predicted has moved to the outside of the route, whether the movement direction of a detected outside person has changed and avoided intersection with the route, and the like. When a collision is avoided, the controller 18 ends the processing in FIG. 3. When a collision is not avoided, the controller 18 returns the processing to the step ST4. In this case, the controller 18 repeats the processing in the step ST4 and the step ST6 until a collision is detected or avoided.

Meanwhile, in such an automobile 1 according to the present embodiment, an airbag for an outside person, can be expanded on the bonnet hood 5. By using such an outside airbag device 17, a direct collision of an outside person with the body 2 can be avoided.

There is however a possibility that this is not necessarily sufficient as protection of an outside person.

For example, after a direct collision of an outside person with the body 2 is avoided by the expanded main bag body 21, the outside person may have a possibility of moving from on the main bag body 21 that has been expanded and dropping from the bonnet hood 5. When an outside person drops to a side of the automobile 1, there is a possibility of the outside person secondarily colliding with the other automobile 1 or the like that travels on an adjacent lane.

FIG. 1 is an illustration of a secondary collision predictable for an outside pedestrian, an outside cyclist, or the like that has collided with a first automobile 30.

Figure 4:
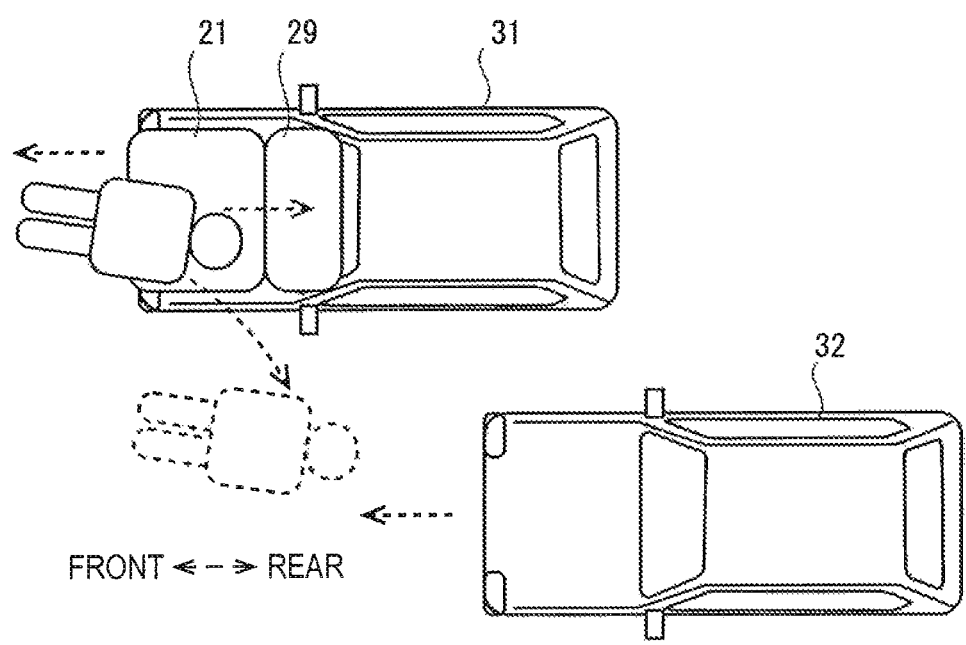

FIG. 4 illustrates an outside pedestrian, the first automobile 30 that has collided with the pedestrian, and a second automobile 31 that intends to pass a side of the first automobile 30.

The pedestrian that has collided with the first automobile 30 is supposed to be first placed on the main bag body 21 expanded on the bonnet hood 5. Then, the pedestrian that has collided has a possibility of, for example, sliding rearward on the main bag body 21. In this case, the pedestrian that has collided has a possibility of coming into contact with the other main bag body 21 that is expanded at the front of the windshield 4 and being able to stop at the position. Meanwhile, for example, as a result of having moved so as to cross in immediate front the automobile 1, the pedestrian that has collided has a possibility of moving obliquely rearward after placed on the main bag body 21 expanded on the bonnet hood 5. In this case, when a movement in the vehicle width direction is large, the pedestrian that has collided has a possibility of dropping from on the bonnet hood 5 to a side of the first automobile 30. When the second automobile 31 intends to pass a side of the first automobile 30, the pedestrian that has dropped has a possibility of further coming into contact with the second automobile 31.

Thus, for the outside protection apparatus 10 of the automobile 1, a further improvement in protection of an outside persons is addressed.

Figure 5A:
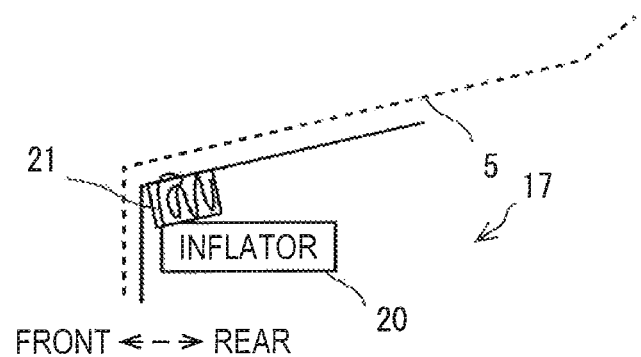
FIG. 5A, FIG. 5B, and FIG. 5C are illustrations of an outside airbag device according to an embodiment of the disclosure.
Figure 5B:
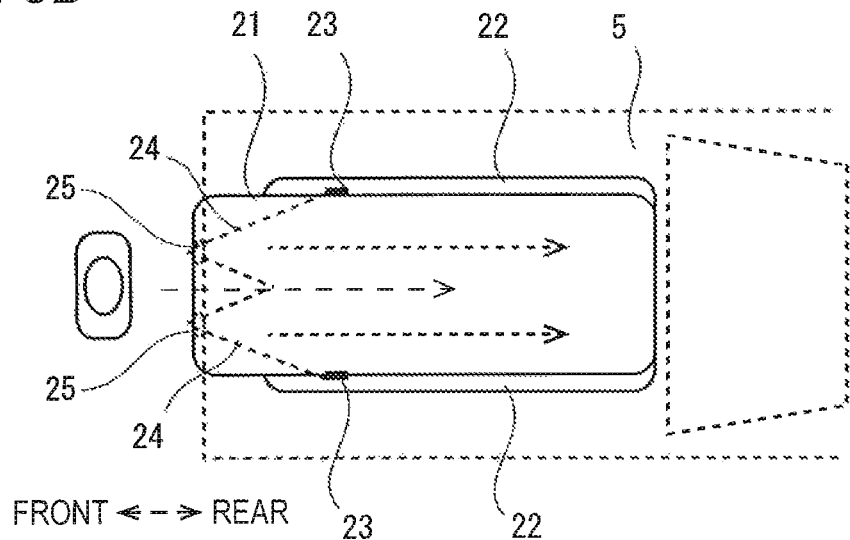
Figure 5C:
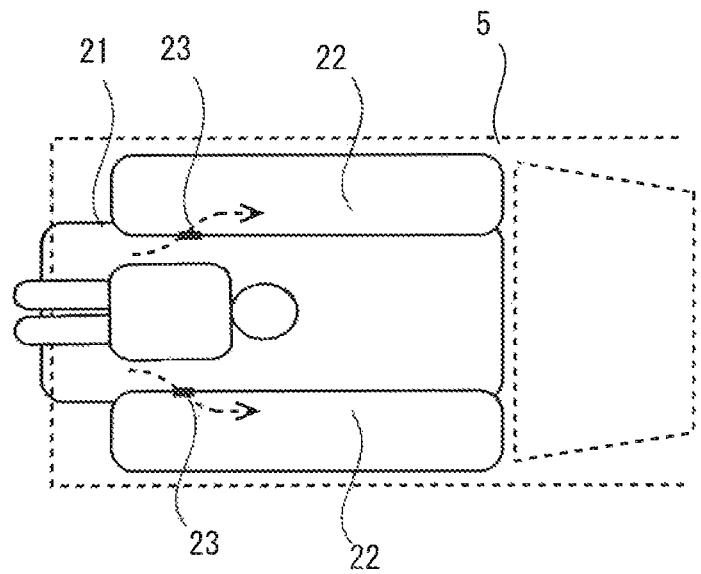

FIG. 5A, FIG. 5B, and FIG. 5C are illustrations of the outside airbag device 17 according to an embodiment of the disclosure.

FIG. 5A is an illustration in which components of the outside airbag device 17 before expansion are viewed from a side.

FIG. 5B is an illustration in which the outside airbag device 17 in a state in which the main bag body 21 is expanded is viewed from the top.

FIG. 5C is an illustration, in which the outside airbag device 17 in a state in which sub bag bodies 22 are expanded is viewed from the top.

The outside airbag device 17 in FIG. 5A, FIG. 5B, and FIG. 5C includes the main bag body 21 as a first bag body, the sub bag bodies 22 as a left-right pair of second bag bodies expandable from the left and right sides of the main bag body 21 in the vehicle width direction, and the inflator 20.

As illustrated in FIG. 5B, each of the sub bag bodies 22 is able to be in communication with the main bag body 21 through a communication valve 23 provided at a face where the sub bag body 22 and the main bag body 21 collide with each other. Until the main bag body 21 is expanded as illustrated in FIG. 5B, the communication valve 23 is closed.

As illustrated in FIG. 5B, a tether 24 is coupled to the closed communication valve 23 in the inner portion of the main bag body 21. The tether 24 is coupled at one end to the communication valve 23 to close the valve and coupled at the other end to an upper surface center portion of the inner surface of the main bag body 21. The tether 24 may be coupled at the other end to a portion slightly displaced toward the front from the upper surface center portion of the inner surface of the main bag body 21. As illustrated in FIG. 1A, FIG. 1B, and FIG. 1C, after coming into contact with the body 2, an outside person is often placed on a portion of the main bag body 21 from the front edge to the upper surface center portion thereof. A part on which the load of an outside person directly acts is easily pulled rearward strongly in response to the outside person moving rearward after that.

For example, the communication valve 23 may be constituted by a hole that passes through the sub bag body 22 and the main bag body 21, and a fabric body that is overlaid with respect to the hole, for example; from the side of the main bag body 21. The fabric body may be provided as a portion of the sub bag body 22 or the main bag body 21. In this case, the communication valve 23 is closed as a result of the fabric body being overlaid to be in close contact with the hole, and the communication valve 23 is opened as a result of the fabric body being separated from the hole. The tether 24 may be coupled to the communication valve 23 to close the valve as a result of the fabric body overlaid in close contact with the hole and the sub bag body 22 or the main bag body 21 being sewed together.

The tether 24 may be sewed such that the fabric body around the hole that passes through the sub bag body 22 and the main bag body 21 is gathered and squeezed, for example, such that the sub bag body 22 and the main bag body 21 are gathered and squeezed. When the load of an outside person acts on the main bag body 21 in a state in which the main bag body 21 is expanded to the maximum extent as illustrated in FIG. 5B and tension acts on the tether 24, the main bag body 21 is deformed so as to be pulled rearward together with the outside person. Consequently, the tether 24 comes off from the communication valve 23, which opens the communication valve 23. A portion of the high-pressure gas that has been jetted by the inflator 20 into the main bag body 21 starts to flow into each sub bag body 22 through the communication valve 23. The sub bag bodies 22 are coupled to the main bag body 21 and expanded in response to the high-pressure gas in the inflator 20 flowing thereinto through the main bag body 21. The sub bag bodies 22 are able to start to be expanded, for example, after the main bag body 21 is expanded to the maximum extent and then starts to be contracted by the load of the outside person. As illustrated in FIG. 5, the sub bag bodies 22 enter a state of being largely expanded on both sides of the main bag body 21 in the vehicle width direction.

Figure 6A:
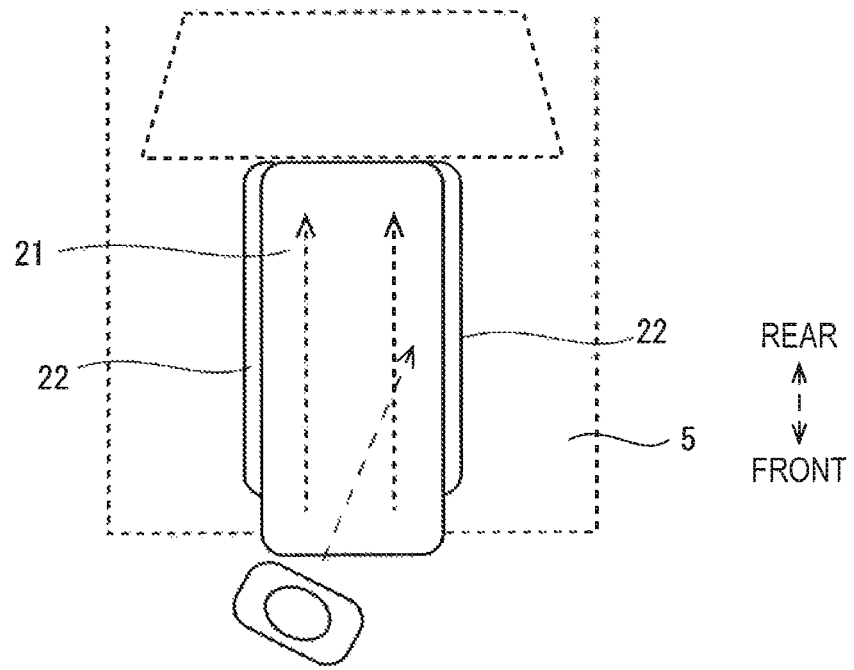
FIG. 6A and FIG. 6B are illustrations of a protected state of an outside person protected by side airbags in FIG. 5A, FIG. 5B, and FIG. 5C.
Figure 6B:
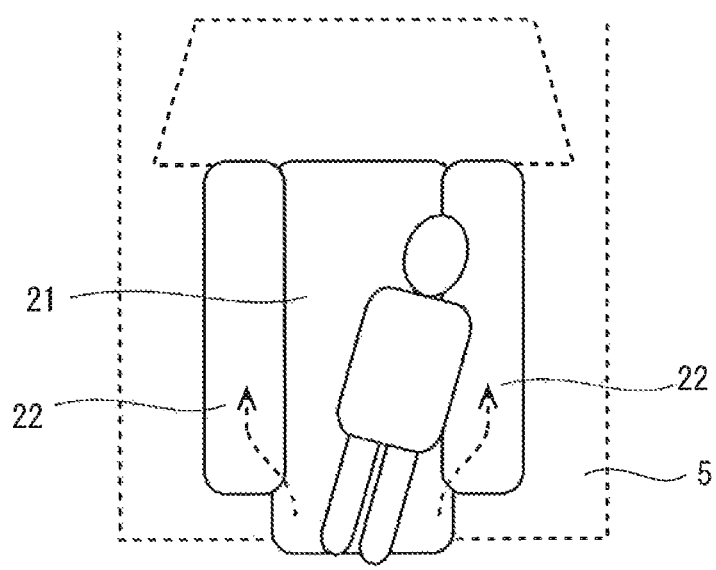

FIG. 6A and FIG. 6B are illustrations of a protected state of an outside person protected by the side airbags in FIG. 5A, FIG. 5B, and FIG. 5C.

As with FIG. 5B, FIG. 6A corresponds to a state before a collision.

As with FIG. 5C, FIG. 6B corresponds to a state after a collision.

In FIG. 6A and FIG. 6B, the outside person moves obliquely rearward after a collision, differently from the rearward movement in FIG. 5A, FIG. 5B, and FIG. 5C.

In this case, the outside person is first placed on the main bag body 21 expanded, as illustrated in FIG. 6A, at a center portion on the bonnet hood 5. Then, the outside person starts to move obliquely rearward on the main bag body 21. Due to the load of the person placed on the main bag body 21, the communication valves 23 are opened, and the sub bag bodies 22 are expanded at the left and the right of the main bag body 21. Thus, the outside person that is to be moved obliquely rearward on the main bag body 21 comes into contact with the sub bag body 22, as illustrated in FIG. 6B, and are suppressed from being easily moved in the vehicle width direction. As a result, the outside person is suppressed from easily dropping from the bonnet hood 5.

Figure 7A:
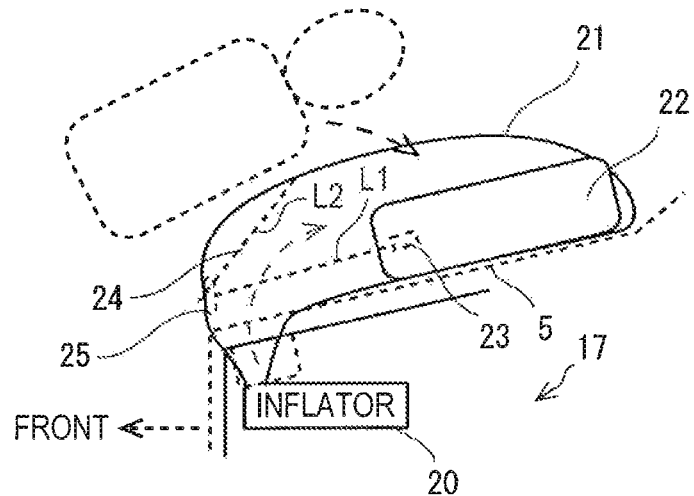
FIG. 7A, FIG. 7B, and FIG. 7C are illustrations of a mechanism that expands the side airbags in FIG. 5A, FIG. 5B, and FIG. 5C.
Figure 7B:
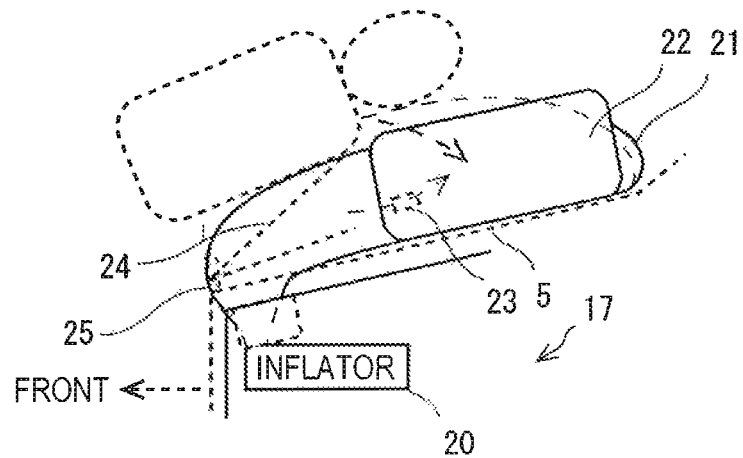
Figure 7C:
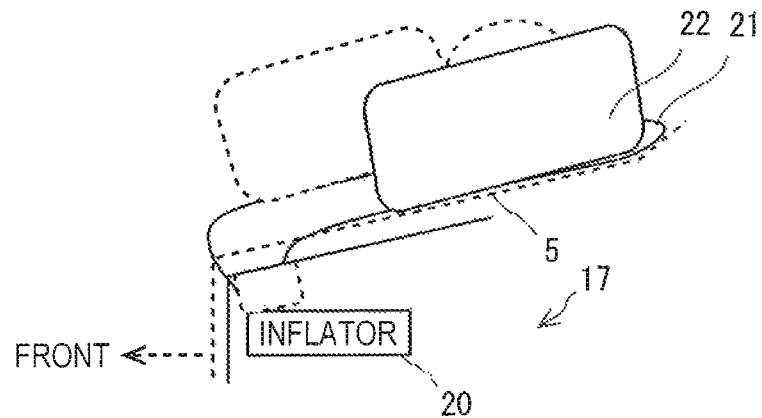

FIG. 7A, FIG. 7B, and FIG. 7C are illustrations of a mechanism that expands the side airbags in FIG. 5A, FIG. 5B, and FIG. 5C.

FIG. 7A illustrates a state in which the main bag body 21 is expanded to the maximum extent. In this state, the load of the outside person does not act on the main bag body 21.

The tether 24 is provided in the inner side of the main bag body 21 by being folded back at the front surface part of the main bag body 21. The tether 24 is coupled between the coupled location with respect to the communication valve 23 and the upper surface center portion of the main bag body 21. The tether 24 is provided to be folded back in the inner portion of the main bag body 21 by being inserted through a ring 25 provided at the front surface of the main bag body 21. Thus, with the coupled location regarding the one end with respect to the communication valve 23 being used as a reference, the tether 24 is provided in the inner side of the main bag body 21 by being folded back at a location away from the coupled location regarding the other end with respect to the upper surface center portion of the main bag body 21.

The total length of the folded-back tether 24 is a length corresponding to the total sum of a distance L1 from the coupled location with respect to the communication valve 23 to the folded-back location at the ring 25 and a distance L2 from the folded-back location at the ring 25 to the coupled location with respect to the upper surface center portion of the main bag body 21, in a state in which the main bag body 21 is expanded to the maximum extent. The total length of the tether 24 may be slightly longer than the total sum of the distance L1 and the distance L2.

FIG. 7B illustrates a state in which the main bag body 21 starts to be contracted in response to the load of an outside person acting on the main bag body 21 that has been expanded to the maximum extent.

When the load of an outside person acts on the main bag body 21 that has been expanded to the maximum extent, the main bag body 21 is deformed from a shape (indicated by the broken line in the figure) in the state of being expanded to the maximum extent. The load of the outside person basically acts rearwardly, and the main bag body 21 is thus deformed so as to be pulled rearward. In particular, the part at the upper surface center portion of the main bag body 21 on which the load of the outside person directly acts moves rearward. Consequently, the tether 24 on which tension is applied in the maximum expansion state comes off at the one end from the communication valve 23 due to the other end moving rearward. The communication valve 23 is thereby opened and makes the main bag body 21 and the sub bag body 22 be in communication with each other. Due to the load of the outside person acting on the main bag body 21 that has been expanded to the maximum extent, the high-pressure gas in the main bag body 21 flows into the sub bag bodies 22 that have not been expanded yet. Even when the main bag body 21 is provided with an exhaust valve, a portion of the high-pressure gas in the main bag body 21 flows into the sub bag bodies 22 that have not been expanded yet. Consequently, the sub bag bodies 22 are expanded.

FIG. 7C illustrates a state in which the main bag body 21 is contracted by the load of the outside person and the sub bag bodies 22 are expanded.

The contraction of the main bag body 21 is caused to proceed by the load of the outside person continuously acting thereon, and the sub bag bodies 22 are largely expanded. As a result, the upper edges of the sub bag bodies 22 project upward largely from the upper surface of the contracted main bag body 21. Therefore, the outside person that is to be moved in the vehicle width direction on the upper surface of the contracted main bag body 21 comes into contact with the largely expanded sub bag bodies 22, as illustrated in FIG. 6B, and the movement of the outside person is stopped. Consequently, the outside person is avoided from dropping off from on the bonnet hood 5.

Figure 8:
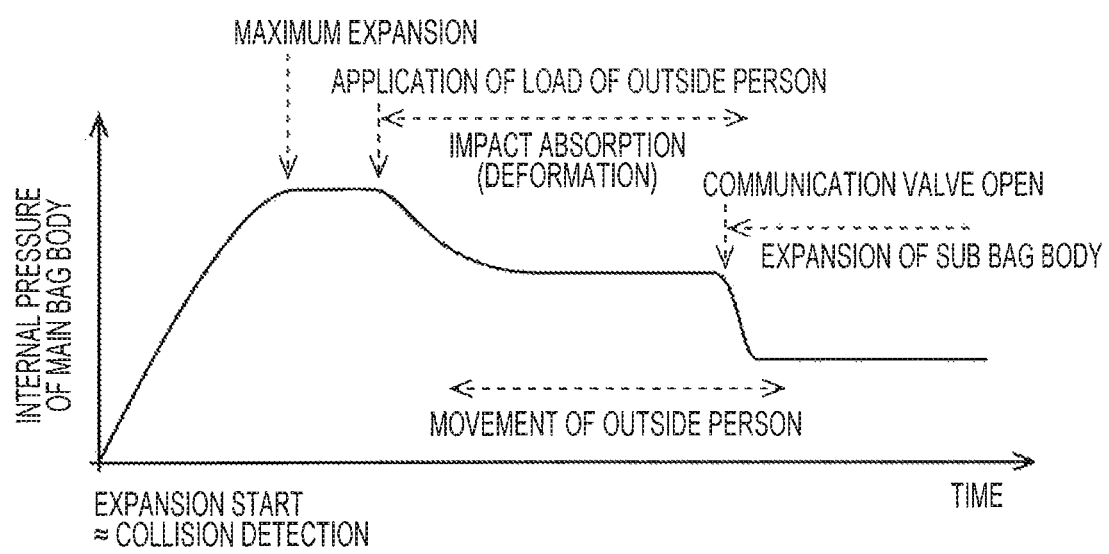
FIG. 8 is a graph schematically illustrating an example of a change in the internal pressure of a main bag body.

FIG. 8 is a graph schematically illustrating an example of a change in the internal pressure of the main bag body 21.

The horizontal axis of FIG. 8 indicates time. The vertical axis indicates the internal pressure of the main bag body.

The main bag body 21 starts to be expanded in response to a collision with an outside person being detected or predicted. The main bag body 21 is then expanded into a state of being inflated to the maximum extent.

The outside person falls down onto the expanded main bag body 21, preferably, onto the main bag body 21 in a state of being inflated to the maximum extent as illustrated in FIG. 8. Consequently, the load of the outside person that has fallen down starts to act on the expanded main bag body 21. The main bag body 21 may discharge a portion of the gas through an exhaust valve (not illustrated after expanded to the maximum extent and after the load of the outside person acting thereon. In the present embodiment, an outside person that is, for example, placed or to be moved rearward on the main bag body 21 in a state of being inflated to the maximum extent causes the main bag body 21 to be deformed with contraction and absorb the impact that acts on the outside person.

The deformation of the main bag body 21 causes the tether 24 to come off from the communication valve 23, and the communication valve 23 is opened. Consequently, a portion of the high-pressure gas in the main bag body 21 flows into the sub bag bodies 22. The sub bag bodies 22 are expanded. The sub bag bodies 22 are expanded along the side portions of the main bag body 21 at a location higher than the contracted main bag body 21. Consequently, even when the outside person on the main bag body 21 is to be moved in an obliquely rearward direction so as to include a component of a movement in the vehicle width direction, it is possible to block the movement by the expanded sub bag bodies 22.

As above, in the present embodiment, the sub bag bodies 22 are expandable from the side portions of the main bag body 21 in the vehicle width direction. The main bag body 21 itself is thus not formed to a large size for covering the bonnet hood 5 in a state of having a wide width corresponding to the entirety of the vehicle width. As a result, the main bag body 21 expanded to be overlaid on the bonnet hood 5 can be expanded in a short period before the timing when the outside person falls down toward the bonnet hood 5, which increases a possibility of absorbing the impact when the outside person falls down toward the bonnet hood 5. The main bag body 21 easily enters a state of being expanded by the maximum pressure before the outside person falls down.

Moreover, at the side portions in the vehicle width direction of the main bag body 21 that is expanded to be overlaid on the bonnet hood 5, the sub bag bodies 22 are expanded later than the main bag body 21. Basically, the sub bag bodies 22 are simply expanded after the main bag body 21 starts to be expanded. For example, the sub bag bodies 22 may start to be expanded after the main bag body 21 is expanded to the maximum extent and starts to be contracted. Consequently, even when the outside person that has fallen down onto the bonnet hood 5 and for which the impact has been absorbed by the main bag body 21 is to be moved by sliding on the main bag body 21, the movement can be blocked by the sub bag bodies 22 that have been expanded belatedly. The outside person is suppressed from easily sliding in the vehicle width direction and dropping from on the main bag body 21 to the left or the right of the body 2 after falling down on the bonnet hood 5.

In contrast, for example, if only the main bag body 21 is expanded, there is a possibility that the outside person drops to the left or the right of the body 2 after the impact is absorbed by the main bag body 21. In this case, even when the sub bag bodies 22 expandable concurrently with the main bag body 21 are provided at the side portions of the main bag body 21, the sub bag bodies 22 are expanded substantially concurrently with the main bag body 21 without a time difference and contracted. The sub bag bodies 22 that have started to be contracted as with the main bag body 21 that has started to be contracted for impact absorption have a possibility of not being able to sufficiently exert, with respect to an outside person that is to be caused to slide in the vehicle width direction after the impact is absorbed, an effect of blocking the slide.

In the present embodiment, the sub bag bodies 22 are coupled to the main bag body 21 and expandable in response to the high-pressure gas in the inflator 20 flowing through the main bag body 21 into the sub bag bodies 22. Consequently, the sub bag bodies 22 can be expanded by secondarily utilizing the high-pressure gas jetted by the inflator 20 to expand the main bag body 21. The inflator 20 that jets a high-pressure gas exclusively to the sub bag bodies 22 is thus not provided. In particular, due to that the communication valves 23 that make the sub bag bodies 22 and the main bag body 21 be in communication with each other are opened after the main bag body 21 is expanded to the maximum extent, the inflator 20 that jets the high-pressure gas into the main bag body 21 simply has a capacity with which, basically, the main bag body 21 can be expanded. The inflator 20 does not have a high capacity for expanding the main bag body 21 and the sub bag bodies 22 concurrently.

In the present embodiment, the tether 24 is provided in the inner side of the main bag body 21. The tether 24 is coupled at one end to the communication valve 23 to close the valve and coupled at the other end to the upper surface center portion of the main bag body 21 or a portion slightly displaced to the front from the upper surface center portion. With the coupled location regarding the one end with respect to the communication valve 23 being used as a reference, the tether 24 is provided in a location away from the coupled location regarding the other end with respect to the upper surface of the main bag body 21 in a state in which the main bag body 21 is expanded to the maximum extent, that is, provided in the inner side of the main bag body 21 by being folded back at the ring 25 provided at the front surface of the main bag body 21. In some embodiments, the tether 24 is longer than a distance between the coupled location regarding the one end with respect to the communication valve 23 and the coupled location regarding the other end with respect to the upper surface of the main bag body 21. Consequently, the tether 24 can be configured not to open the communication valve 23 until the main bag body 21 is expanded to the maximum extent. Moreover, the tether 24 can open the communication valve 23 because the tether 24 is pulled together with the upper surface of the main bag body 21 as a result of the main bag body 21 being expanded to the maximum extent and the load of the outside person then acting thereon and deforming the surface of the main bag body 21 rearwardly. Consequently, the sub bag bodies 22 can be expanded later than the main bag body 21. By being pulled, the tether 24 can mechanically open the communication valve 23.

The above embodiment is an example of embodiments of the disclosure. The disclosure is, however, not limited thereto. In the disclosure, various modifications or changes are possible within a range not deviating from the gist of the disclosure.

For example, in the above-described embodiment, the communication valve 23 is mechanistically opened by using the tether 24. As a result of the communication valve 23 being opened, the sub bag body 22 starts to be expanded later than the main bag body 21 in response to the high-pressure gas in the main bag body 21 flowing into the sub bag body 22.

Alternatively, for example, opening and closing of the communication valve 23 may be controlled through electronic control by the controller 18. In this case, the controller 18 simply opens the closed communication valve 23 after causing the inflator 20 of the main bag body 21 to operate.

The sub bag body 22 may be configured to be expanded by an inflator that differs from the inflator of the main bag body 21. In this case, the controller 18 simply causes the inflator 20 of the sub bag body 22 after causing the inflator 20 of the main bag body 21.

However, when the controller 18 performs another control separately from the control of the inflator 20 for expansion of the main bag body 21, timing control thereof is performed. In particular, to expand the sub bag body 22 at a proper timing after the load of an outside person starts to act on the main bag body 21 that has been expanded to the maximum, extent, a timing of falling-down of the outside person onto the main bag body 21, the timing having a possibility of occurring irrespective of the expansion timing of the main bag body 21, is exactly predicted. In the above-described embodiment, the action of the falling-down itself is utilized, and it is thus possible to adjust these timing.

In the aforementioned embodiment, the main bag body 21 has a width narrower than the width of the bonnet hood 5, as illustrated in FIG. 5B and FIG. 5C.

Alternatively, for example, the main bag body 21 may have a width, equal, to the width of the bonnet hood 5, as illustrated in FIG. 1A. In this case, the sub bag bodies 22 are simply provided, for example, on the side portions of the main bag body 21 in the vehicle width direction. Consequently, the sub bag bodies 22 can be expanded at the side portions of the main bag body 21. The sub bag bodies 22 can be expanded to project upward more than the main bag body 21 that has started to be contracted.

Figure 9A:
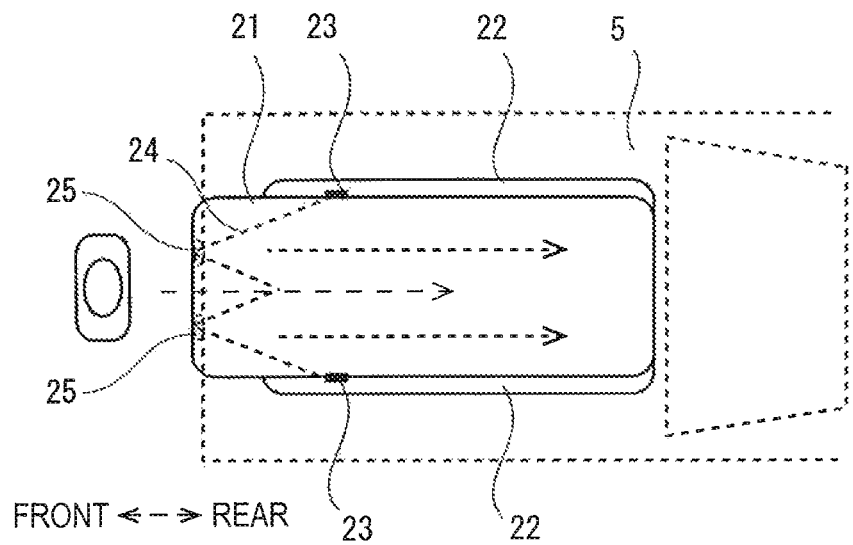
FIG. 9A and FIG. 9B are illustrations of a modification of a tether.
Figure 9B:
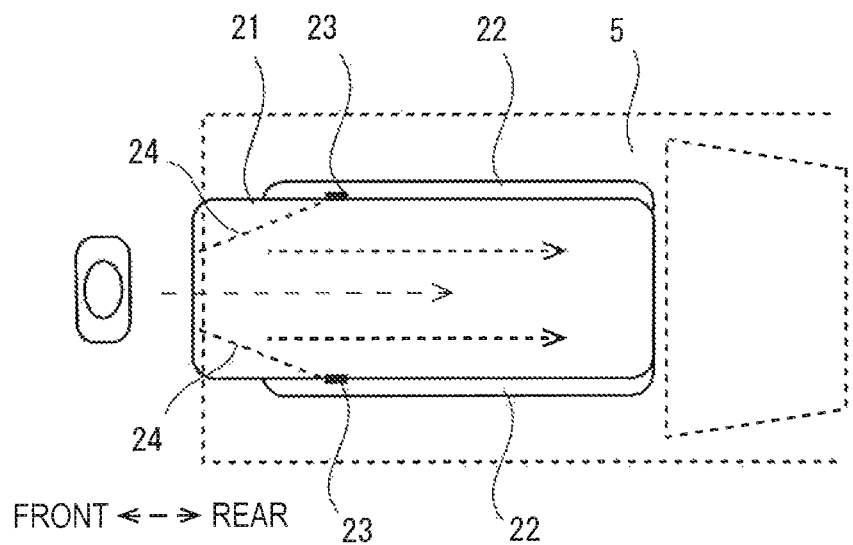

FIG. 9A and FIG. 9B are illustrations of a modification of the tether 24.

In FIG. 9A, two tethers 24, which are provided at the left and the right in FIG. 5A, FIG. 5B, and FIG. 5C, are formed into a single tether. The single tether 24 is mounted at the center portion thereof to an upper surface center portion of the main bag body 21 and coupled at both ends thereof to the communication valves 23 at the left and the right. As with the left and right two tethers 24 in FIG. 5A, FIG. 5B, and FIG. 5C, the single tether 24 is folded back at the ring 25 provided at the front portion of the main bag body 21.

In FIG. 9B, each of the tethers 24 that are individually provided at the left and the right is coupled at the other end thereof to a front portion of the main bag body 21. Each tether 24 may be provided between the front portion of the expanded main bag body 21 and the communication valve 23 to be in a linear shape without being folded back or may be provided by being folded back at the upper surface and the lower surface of the main bag body 21.

Even when each tether 24 extends as described above, the communication valve 23 can be opened by the main bag body 21 being deformed rearwardly in response to the load of an outside person acting thereon and causing the tether 24 to come off from the communication valve 23.

In the above-described embodiment, each tether 24 is provided such that the sub bag body 22 or the main bag body 21 and the fabric body that is overlaid in close contact with the hole to constitute the communication valve 23 are sewed together. In this case, the tether 24 is coupled so as to close the communication valve 23. In response to the main bag body 21 starting to be expanded and being pulled, the tether 24 comes off such that the sewing is released. Consequently, the closed communication valve 23 is opened.

Alternatively, for example, the tether 24 may not come off such that the sewing is released. Even when part of the sewing is released, the communication valve 23 closed by the tether 24 can be opened.

Alternatively, for example, the communication valve 23 closed by the tether 24 may be opened in response to the tether 24 being pulled and cut.

Alternatively; for example; in response to the tether 24 being pulled, a plurality of base fabrics that are overlaid to form the closed communication valve 23 may be displaced or separated from each other.

The invention claimed is:

1. An outside protection apparatus for a vehicle, the apparatus comprising:
an outside airbag device comprising:
a first bag body expandable to be overlaid on a hood of a body of the vehicle rearwardly from a front portion of the body;
an inflator configured to expand the first bag body; and
a second bag body expandable from a side portion of the first bag body in a width direction of the vehicle later than the first bag body, and wherein the first bag body and the second bag body are configured as to have the second bag body initiate expansion after the first bag body is expanded to a maximum extent and after an occurrence of first bag body contraction due to impact absorption.

2. The outside protection apparatus for a vehicle according to claim 1,
wherein the second bag body is coupled to the first bag body and expandable with a high-pressure gas in the inflator flowing into the second bag body through the first bag body.

3. The outside protection apparatus for a vehicle according to claim 2,
wherein the outside protection apparatus comprises:
a communication valve configured to communicate the second bag body with the first bag body,
a tether coupled at a first end to the communication valve which is closed and coupled at a second end to an upper surface of the first bag body; and
a ring disposed at a front surface of the first bag body,
wherein the tether is disposed in an inner side of the first bag body in such a manner that the tether is folded back in an inner portion of the first bag body by being inserted through the ring, and
wherein the communication valve which is closed is configured to be opened in response to the tether being pulled.

4. The outside protection apparatus for a vehicle according to claim 3, wherein the tether is longer than a distance between a coupled location regarding the first end with respect to the communication valve and a coupled location regarding the second end with respect to the upper surface of the first bag body.

5. The outside protection apparatus for a vehicle according to claim 1,
wherein the second bag body is coupled to the first bag body and expandable with a high-pressure gas in the inflator flowing into the second bag body through the first bag body, and wherein the inflator is a single inflator that generates sufficient high-pressure gas as to represent the only inflator that inflates both the first bag body and the second bag body.

6. The outside protection apparatus for a vehicle according to claim 5,
wherein the outside protection apparatus comprises:
a communication valve configured to communicate the second bag body with the first bag body,
a tether coupled at a first end to the communication valve which is closed and coupled at a second end to an upper surface of the first bag body; and
a ring disposed at a front surface of the first bag body,
wherein the tether is disposed in an inner side of the first bag body in such a manner that the tether is folded back in an inner portion of the first bag body by being inserted through the ring, and
wherein the communication valve which is closed is configured to be opened in response to the tether being pulled.

7. The outside protection apparatus for a vehicle according to claim 6, wherein the tether is longer than a distance between a coupled location regarding the first end with respect to the communication valve and a coupled location regarding the second end with respect to the upper surface of the first bag body.

8. The outside protection apparatus for a vehicle according to claim 1, further comprising a communication valve configured to communicate the second bag body with the first bag body.

9. The outside protection apparatus for a vehicle according to claim 8,
wherein the outside protection apparatus comprises:
a tether coupled at a first end to the communication valve which is closed and coupled at a second end to an upper surface of the first bag body; and
a ring disposed at a front surface of the first bag body,
wherein the tether is disposed in an inner side of the first bag body in such a manner that the tether is folded back in an inner portion of the first bag body by being inserted through the ring, and
wherein the communication valve is closed with a covering, which covering is configured to be pulled away as to open the communication valve in response to the tether being pulled.

10. The outside protection apparatus for a vehicle according to claim 9, wherein the tether is longer than a distance between a coupled location regarding the first end with respect to the communication valve and a coupled location regarding the second end with respect to the upper surface of the first bag body.

11. The outside protection apparatus for a vehicle according to claim 1, further comprising a communication valve configured to communicate the second bag body with the first bag body, and wherein the valve is configured to be triggered into opening based on an electronic control signal from a controller.

12. The outside protection apparatus for a vehicle according to claim 1, further comprising a communication valve configured to communicate the second bag body with the first bag body, the communication valve comprising a covering with a tether connection.

13. The outside protection apparatus for a vehicle according to claim 1,
wherein the outside protection apparatus comprises:
a communication valve configured to communicate the second bag body with the first bag body,
a tether coupled at a first end to the communication valve which is closed and coupled at a second end to an upper surface of the first bag body; and
a ring disposed at a front surface of the first bag body,
wherein the tether is disposed in an inner side of the first bag body in such a manner that the tether is folded back in an inner portion of the first bag body by being inserted through the ring, and
wherein the communication valve which is closed is configured to be opened in response to the tether being pulled.

14. The outside protection apparatus for a vehicle according to claim 13, wherein the tether is longer than a distance between a coupled location regarding the first end with respect to the communication valve and a coupled location regarding the second end with respect to the upper surface of the first bag body.

15. The outside protection apparatus for a vehicle according to claim 1,
wherein the second bag body is coupled to the first bag body and expandable with a high-pressure gas in the inflator flowing into the second bag body through the first bag body, and wherein the outside protection apparatus comprises:
a communication valve configured to communicate the second bag body with the first bag body,
a tether coupled at a first end to the communication valve which is closed and coupled at a second end to an upper surface of the first bag body, and
wherein the communication valve which is closed is configured to be opened in response to the tether being pulled.

16. The outside protection apparatus for a vehicle according to claim 15, wherein the tether is longer than a distance between a coupled location regarding the first end with respect to the communication valve and a coupled location regarding the second end with respect to the upper surface of the first bag body.

17. The outside protection apparatus for a vehicle according to claim 1, further comprising a valve, and wherein initiation of the second bag body expansion, after the first bag body is expanded to the maximum extent and after the occurrence of first bag body contraction, is based on a controlled release of the valve.

18. The outside protection apparatus for a vehicle according to claim 17, wherein the valve comprises a covering with tether connection.

19. An outside protection apparatus for a vehicle, the apparatus comprising:
an outside airbag device comprising:
a first bag body expandable to be overlaid on a hood of a body of the vehicle rearwardly from a front portion of the body;
an inflator configured to expand the first bag body; and
a second bag body expandable from a side portion of the first bag body in a width direction of the vehicle later than the first bag body, wherein the second bag body is coupled to the first bag body and expandable with a high-pressure gas in the inflator flowing into the second bag body through the first bag body, and
wherein the outside protection apparatus comprises:
a tether coupled at a first end to the communication valve which is closed and coupled at a second end to an upper surface of the first bag body; and
a ring disposed at a front surface of the first bag body,
wherein the tether is disposed in an inner side of the first bag body in such a manner that the tether is folded back in an inner portion of the first bag body by being inserted through the ring, and
wherein the communication valve which is closed is configured to be opened in response to the tether being pulled.

20. The outside protection apparatus for a vehicle according to claim 19, wherein the tether is longer than a distance between a coupled location regarding the first end with respect to the communication valve and a coupled location regarding the second end with respect to the upper surface of the first bag body.

* * * * *